(12) United States Patent
Liu

(10) Patent No.: US 11,177,974 B2
(45) Date of Patent: Nov. 16, 2021

(54) CONSISTENT PROVISION OF MEMBER NODE GROUP INFORMATION ON VIRTUAL OVERLAY NETWORK

(71) Applicant: INTERNATIONAL BUSINESS MACHINES CORPORATION, Armonk, NY (US)

(72) Inventor: Joseph Liu, Nashua, NH (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/752,928

(22) Filed: Jan. 27, 2020

(65) Prior Publication Data
US 2021/0234715 A1 Jul. 29, 2021

(51) Int. Cl.
*G06F 15/177* (2006.01)
*H04L 12/18* (2006.01)
(Continued)

(52) U.S. Cl.
CPC ........ *H04L 12/185* (2013.01); *H04L 12/4679* (2013.01); *H04L 41/0806* (2013.01); *H04L 67/1095* (2013.01)

(58) Field of Classification Search
USPC ...................................................... 709/222
See application file for complete search history.

(56) References Cited

U.S. PATENT DOCUMENTS 8,416,709 B1 * 4/2013 Marshall ............ H04L 41/0806
370/252

8,949,419 B2 * 2/2015 Tanimoto ............ H04L 67/1059
709/225
(Continued)

FOREIGN PATENT DOCUMENTS

CN 109327315 A 2/2019

OTHER PUBLICATIONS

Anonymous, "A Method and System for Transporting Overlay Multi-Destination Network Traffic By Sending Repetitive Uni-Cast To All Destination Nodes in Underlay", An IP.com Prior Art Database Technical Disclosure, IPCOM000231535D, IP.com Electronic Publication Date: Oct. 4, 2013, 4 pages.
(Continued)

*Primary Examiner* — Anthony Mejia
(74) *Attorney, Agent, or Firm* — Kenneth Han

(57) ABSTRACT

A method, computer system, and computer program product for provisioning member node group information on a virtual overlay network in a multi-controller cloud environment are provided. The embodiment may include one of the controllers receiving a group association call from user interface for a target node, wherein the group message is either an association-add the target node to or association-remove the target node from a node group. The embodiment may also include the controller performing consistent database manipulation by updating a database based on the received association-add or association-remove call, wherein the controller first updates a database by adding or removing the target node to or from, respectively, the node group in the database. The embodiment may further include the controller reading out the updated member node group from the database before issuing a provision-create or a provision-remove request to the target node.

17 Claims, 11 Drawing Sheets

(51) Int. Cl.
*H04L 29/08* (2006.01)
*H04L 12/46* (2006.01)
*H04L 12/24* (2006.01)

(56) References Cited

U.S. PATENT DOCUMENTS

| | | | | |
|---|---|---|---|---|
| 9,137,209 | B1* | 9/2015 | Brandwine | H04L 41/0806 |
| 9,565,543 | B2 | 2/2017 | Raleigh | |
| 10,264,018 | B1 | 4/2019 | Sites | |
| 10,264,138 | B2 | 4/2019 | Raleigh | |
| 10,917,471 | B1* | 2/2021 | Karumbunathan | G06F 11/2076 |
| 2002/0055989 | A1* | 5/2002 | Stringer-Calvert | H04L 29/06 709/220 |
| 2016/0359729 | A1* | 12/2016 | Banavalikar | H04L 45/16 |
| 2017/0180475 | A1* | 6/2017 | Micucci | H04L 67/1095 |
| 2017/0366637 | A1* | 12/2017 | Bandyopadhyay | H04L 67/1095 |
| 2017/0371946 | A1* | 12/2017 | Kota | G06F 16/275 |

OTHER PUBLICATIONS

Anonymous, "Overcoming Internet Protocol/Medium Access Control (IP/MAC) Restrictions in Cloud Networks with Open V-Switch (OVS) Overlay Network", An IP.com Prior Art Database Technical Disclosure, IP.com No. IPCOM000256294D, IP.com Electronic Publication Date: Nov. 16, 2018, 8 pages.

Anonymous, "Method and System for Self-Coordinated Lightweight Management of Distributed Group of Virtual Systems in a Cloud", an IP.com Prior Art Database Technical Disclosure, IP.com No. IPCOM000206943D, IP.com Electronic Publication Date: May 13, 2011, 14 pages.

Dai et al., "CRONets: Cloud-Routed Overlay Networks", 2016 IEEE 36th International Conference on Distributed Computing Systems, Jun. 2016, pp. 67-77.

Firdhous, "Multicasting over Overlay Networks—A Critical Review", (IJACSA) International Journal of Advanced Computer Science and Applications, vol. 2, No. 3, Mar. 2011, pp. 54-61.

Pardina, "Comparison of Virtual Networks Solutions for Community Clouds", KTH Information and Communication Technology, Bachelor of Science Thesis, Stockholm, Sweden, Feb. 2014, 46 pages.

Mell et al., "The NIST Definition of Cloud Computing", Recommendations of the National Institute of Standards and Technology, NIST Special Publication 800-145, Sep. 2011, 7 pages.

* cited by examiner

CONSISTENT PROVISION OF MEMBER NODE GROUP INFORMATION ON VIRTUAL OVERLAY NETWORK

BACKGROUND

The present invention relates, generally, to the field of computing, and more particularly to cloud virtual overlay network systems.

Virtual networking is software-defined networking based on physical computer networking principles. In a virtual networking environment, each virtual machine (VM) is assigned a software-defined virtual network interface card (vNIC) with separate media access control (MAC) and internet protocol (IP) addresses. The VMs communicate by addressing the specified IP address of each destination VM. A virtual local area network (VLAN) is created through software-defined virtual switches that provide layer-2 network communication among all virtual machines (VMs). Like a physical computer with physical networking, a VM usually obtains its specific IP address by means of dynamic host configuration protocol (DHCP) and resolves the next-hop MAC address from the destination IP address by means of address resolution protocol (ARP). Both make use of the broadcast domain capability of the layer-2 virtual networking. Virtual networking also may be implemented on physical servers that are installed or deployed and interconnected by private or internet-enabled physical networks. A virtual overlay network is a virtual network that is built on top of another network. A virtual overlay network decouples network services from the underlying infrastructure by means of tunneling, which encapsulates overlay packet inside of the underlay packet for transport. After the encapsulated packet has been forwarded to the destination endpoint, it is de-encapsulated and delivered. Examples of overlay network deployments include virtual private networks (VPNs), peer-to-peer (P2P) networks, content delivery networks (CDNs), voice over IP (VoIP) services. One of the overlay network protocols that is scalable to support large virtual networking topology is virtual extensible LAN (VXLAN). Another scalable overlay network protocol is a generic routing encapsulation (GRE). In the case of such virtual overlay networks, a virtual network identifier that uniquely identifies a virtual network segment. In the case of VXLAN-based virtual overlay networking, a VXLAN ID or VNID is a virtual network identifier.

On a tunneling based cloud virtual overlay network, such as a virtual network by means of VXLAN tunneling, a guest VM's network connectivity needs to be mapped to VXLAN flows as tunnel rules at each of the physical server nodes for tunneling through the underlay physical IP network. Also in such a virtual network, a layer-2 virtual networking broadcast domain is mapped to a multicast group, consisting of the underlay physical network member nodes that form such a multicast group. Such a multicast group may be emulated as an N-way unicast flow tunnel rule at each of the participating physical server nodes when there is no native IP multicast support offered by the underlay physical network. To guarantee the network reachability of such broadcast domain for the correct operation of guest VM networking activities, when member node(s) are added to or deleted from such multicast group as member node group, it is important to maintain consistent node group member information at each of the member nodes.

SUMMARY

According to one embodiment, a method, computer system, and computer program product for provisioning member node group information on a virtual overlay network in a multi-controller cloud environment are provided. The embodiment may include one of the controllers receiving a group association call for a target node, wherein the group association call is either an add a target node to a node group or a remove a target node from a node group. The embodiment may also include the controller updating a database based on the received "add a node to a node group" or "remove a node from a node group" message for a target node, wherein the controller first updates a database by adding or removing the target node to or from, respectively, the member node group in the database. The embodiment may further include the controller reading out the updated member node group from the database before constructing a provision request with the retrieved member node information and issuing the provision request to the target node, whereas the provision request is either a provision-create or a provision-remove request. The embodiment may further include the target node performing member node synchronization to all member nodes of the member node group for joining or leaving the member node group, and then creating or removing local node group record.

BRIEF DESCRIPTION OF THE SEVERAL VIEWS OF THE DRAWINGS

These and other objects, features, and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
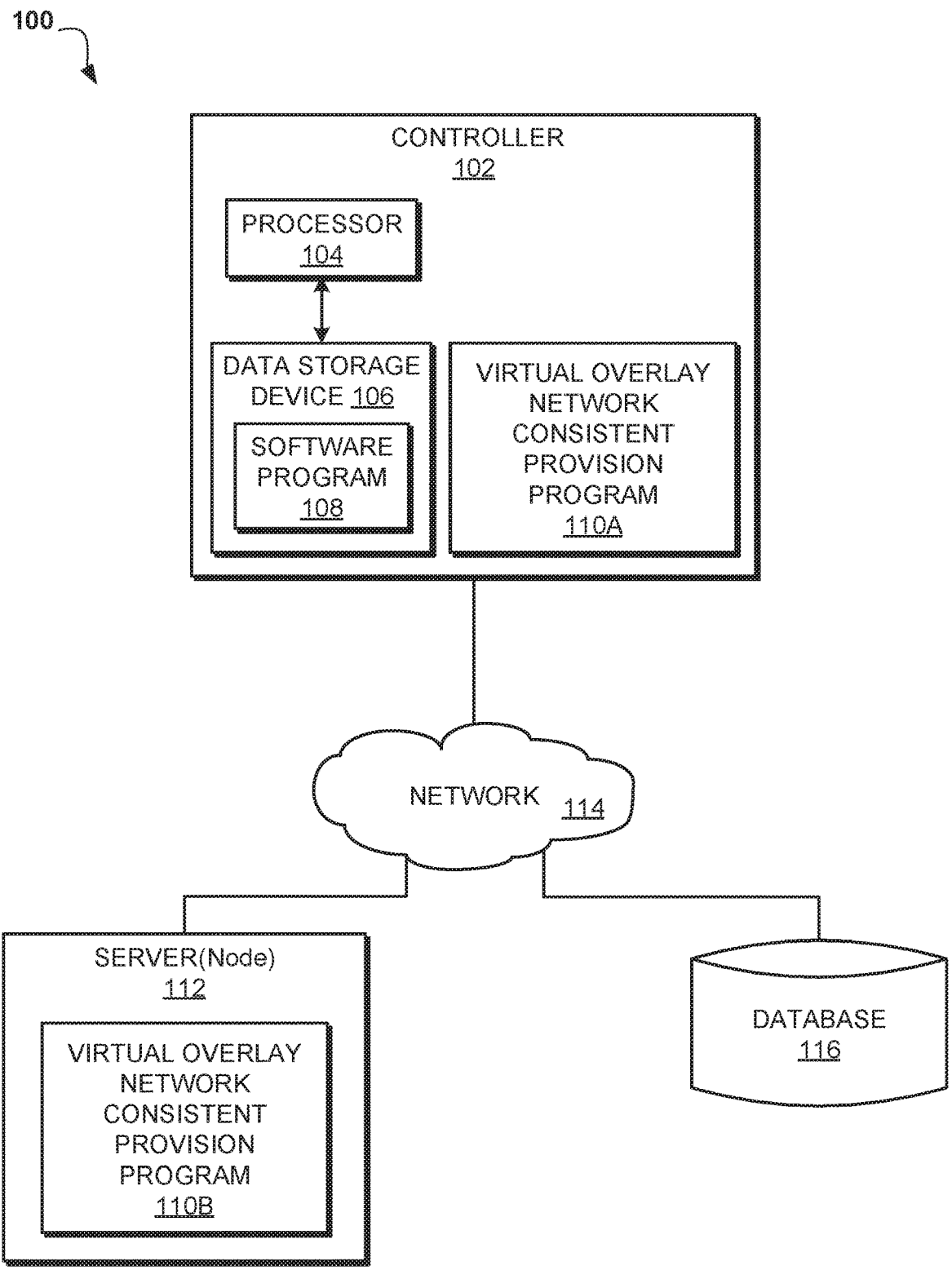
FIG. 1 illustrates an exemplary networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention relate to the field of computing, and more particularly to virtual networking systems. The following described exemplary embodiments provide a system, method, and program product to provision a node (referred as a target node) to a per layer-2 virtual network member node group consistently among all member nodes by controllers performing database update-retrieve process prior to make a provision request to the target node, and the target node performing member node synchronization among all nodes of the member node group in reaction to a provision call. Therefore, the present embodiment has the capacity to improve the technical field of virtual networking systems by allowing a system to avoid the situation that controllers use partial information in provisioning member node(s) to member node group(s) and cause partial or incomplete multicast group or broadcast domain reachability problem.

As previously described, virtual networking is software-defined networking based on physical computer networking principles. In a virtual networking environment, each virtual machine (VM) is assigned a software-defined virtual network interface card (vNIC) with separate media access control (MAC) and internet protocol (IP) addresses. The VMs communicate by addressing the specified IP address of each destination VM. A virtual local area network (VLAN) is created through software-defined virtual switches that provide layer-2 network communication between all virtually connected machines. One of the main features of a layer-2 virtual local area networking is to provide a broadcast domain, where a single layer-2 broadcast packet can reach all VMs interfaced to the layer-2 virtual network. Virtual networking also may be implemented on physical servers that are installed or deployed and interconnected by private or internet-enabled physical networks. An overlay network is a virtual network that is built on top of another network. A virtual overlay network decouples network services from the underlying infrastructure by means of tunneling, which encapsulates overlay network packet inside of the underlay packet for transport. After the encapsulated packet has been forwarded to the destination endpoint, it is de-encapsulated and delivered. Examples of overlay network deployments include virtual private networks (VPNs), peer-to-peer (P2P) networks, content delivery networks (CDNs), voice over IP (VoIP) services. One of the overlay network protocols that is scalable to support large virtual networking deployment is virtual extensible LAN (VXLAN). Another scalable overlay network protocol is a generic routing encapsulation (GRE). In the case of such virtual overlay networks, a virtual network identifier that uniquely identifies a virtual network segment. In the case of VXLAN-based virtual overlay networking, a VXLAN ID or VNID is a virtual network identifier.

On a cloud virtual overlay network, such as a virtual network by means of VXLAN tunneling, a guest VM's network connectivity needs to be mapped to VXLAN flows as tunnel rules at each of the physical server nodes for tunneling through the underlay physical IP network. Also in such a virtual network, a broadcast domain is mapped to a multicast group consisting of all the underlay physical network nodes participating in the multicast group. Such a multicast group may be emulated as an N-way unicast flow tunnel rules at each of the participating physical server nodes when there is no native IP multicast support offered by the underlay physical network. It is important to maintain consistent node group member information among all member nodes of a node group to guarantee the network reachability of such a broadcast domain for the correct operation of guest VM networking activities.

On the other hand, in a cloud environment, multiple controller instances might run concurrently to perform orchestration tasks for scalability and reliability. In such an environment, when a controller retrieves a member node group information from the database, that information may already become partial as other controllers may be in the process of performing provision to the same virtual network and updating the database by adding or removing nodes to or from the same member node group. Therefore, it may be advantageous to implement a system to allow for a consistent member node group provision to avoid the situation where controllers use partial information in provisioning member node(s) to member node group(s) and cause partial or incomplete multicast group(s).

According to one embodiment, the present invention may provision node to per virtual network member node group consistently among all member nodes. In at least one other embodiment, the present invention may perform an update-retrieve-provision procedure where a controller should first update a database by either adding or removing a node (provision action node or target node) to or from the virtual network member node group in the database and then retrieve the updated virtual network member node group before making a provision call to the provision action node or target node.

The present invention may be a system, a method, and/or a computer program product at any possible technical detail level of integration. The computer program product may include the computer readable storage medium (or media) having computer readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (NODE-GA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer-readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or another device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product for provisioning a node to a per virtual network member node group consistently among all member nodes by controllers performing database update-retrieve prior to making a provision call to the target node, and the target node performing member node synchronization among all member nodes of the member node group in reaction to a provision call.

Referring to FIG. 1, an exemplary networked computer environment 100 is depicted according to at least one embodiment. The networked computer environment 100 may include a controller 102, a database 116 and a server (node) 112 interconnected via a communication network 114. According to at least one implementation, the networked computer environment 100 may include a plurality of controllers 102 and servers (nodes) 112 of which the only one of each is shown for illustrative brevity. According to at least one implementation, the database 116 may consist of a database cluster for high availability reasons.

The communication network 114 may include various types of communication networks, such as a wide area network (WAN), local area network (LAN), a telecommunication network, a wireless network, a public switched network and/or a satellite network. The communication network 114 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Controller 102 may include a processor 104 and a data storage device 106 that is to host and run a software program 108, and a virtual overlay network consistent provision program 110A and communicate with the server 112 and the database 116 via the communication network 114, in accordance with one embodiment of the invention. As will be discussed with reference to FIG. 4, the controller computing device 102 may include internal components 402*a* and external components 404*a*, respectively.

The server computer 112 may be a compute server, a laptop computer, netbook computer, personal computer (PC), a desktop computer, or any programmable electronic device or any network of programmable electronic devices capable of hosting and running a virtual overlay network consistent provision program 110B and communicating with the controller 102 via the communication network 114, in accordance with embodiments of the invention. As will be discussed with reference to FIG. 4, the server computer 112 may include internal components 402*b* and external components 404b, respectively. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud.

According to the present embodiment, the virtual overlay network consistent provision program 110A may be a program capable of performing member node management through the manipulation of database 116, and making provision-action call to target node, and virtual overlay network consistent provision program 110B may be a program capable of performing member node group synchronization among all member nodes of the member node group in response to the provision call, and performing local member node group record update. The virtual overlay network consistent provision process is explained in further detail below with respect to FIGS. 2A-2C.

Figure 2A:
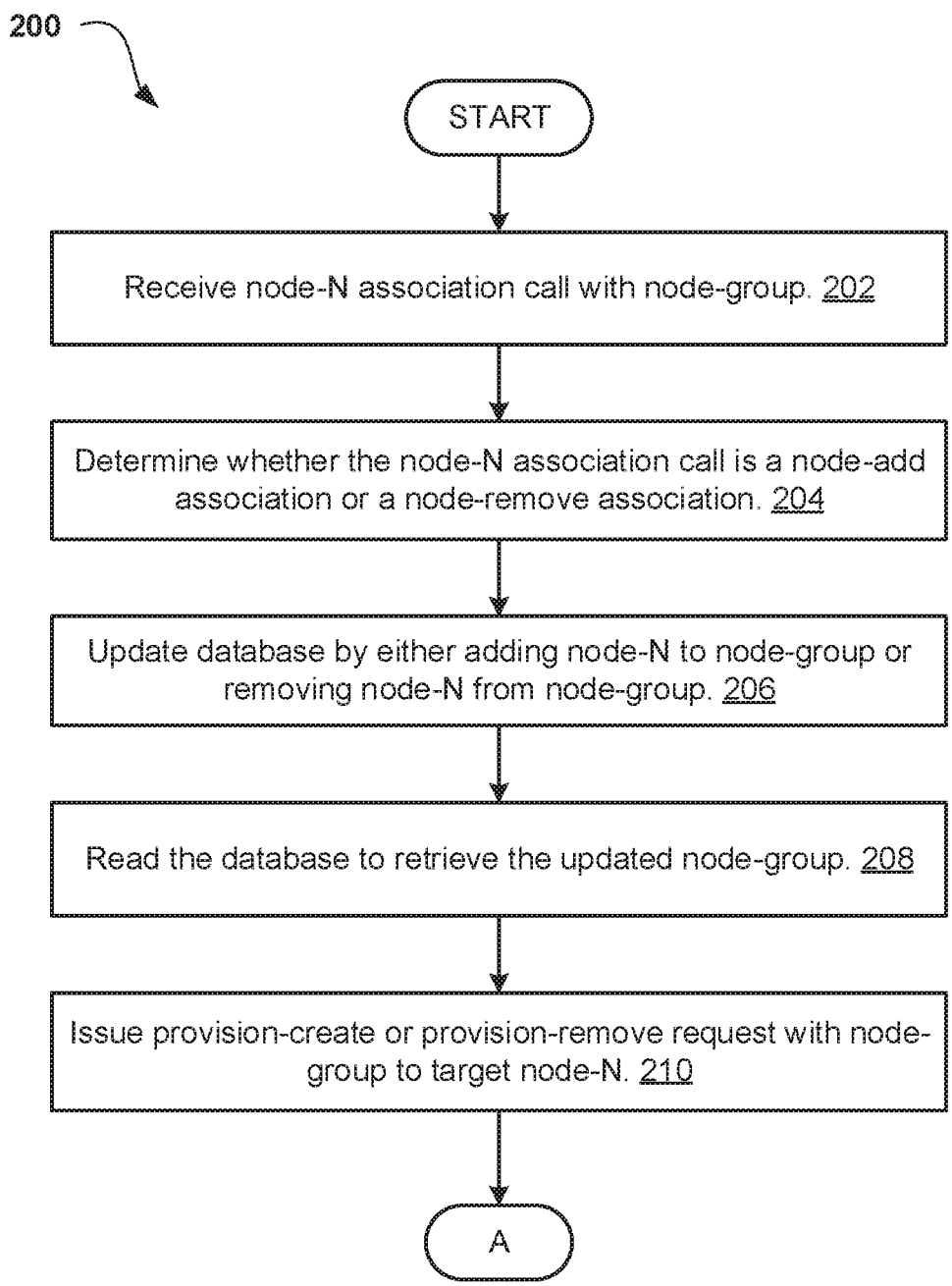
FIGS. 2A-2C are operational flowcharts illustrating a virtual overlay network consistent provision process according to at least one embodiment.

Referring to FIG. 2A, an operational flowchart illustrating a virtual overlay network consistent provision process 200 is depicted according to at least one embodiment. At 202, the virtual overlay network consistent provision program 110A receives a node-N association call with respect to a member node group. In at least one embodiment, a member node group may be a group of nodes and each member node group may have at least one node associated with a virtual network identifier, which is denoted as Group-K hereinafter. In yet another embodiment, the virtual overlay network consistent provision program 110A may receive a user input call for either adding or removing a node from a node group.

At 204, the virtual overlay network consistent provision program 110A determines whether the node association call is to add a node to or remove a node from a node-group. According to one embodiment, the virtual overlay network consistent provision program 110A may first determine if the input call received from a user interface is to add a node to or remove a node from a node group.

At 206, the virtual overlay network consistent provision program 110A updates a database by either adding a node-N to a node group or removing a node-N from a node group. According to one embodiment, the virtual overlay network consistent provision program 110A may interact with the database 116 and update the existing node group information with the new node association call received in the previous steps. If a node-N is added to an already existing node group, the updated node group in the database may now contain all the previously stored nodes plus a node-N. If a node-N is removed from an already existing node group, the updated node group in the database may now contain all previously-stored nodes minus a node-N.

At 208, the virtual overlay network consistent provision program 110A reads the database to retrieve the updated node-group. According to one embodiment, the updated node group may have one additional node or one less node in the node group depending on the database update performed in the previous steps. For example, if a node-N has been added to the already existing node group, the updated node group may now contain previously stored nodes and the node-N.

At 210, the virtual overlay network consistent provision program 110A issues a provision-create or provision-remove request with the updated node group information to target node-N. According to one embodiment, the virtual overlay network consistent provision program 110A may issue a provision request to the target node-N (i.e. the node which was added or removed from the node group stored in the database) with the retrieved node group information in the above steps. In the above example, the virtual overlay network consistent provision program 110A may issue a provision-create request as the updated node group now contains all the previously stored nodes and the newly added node-N.

Figure 2B:
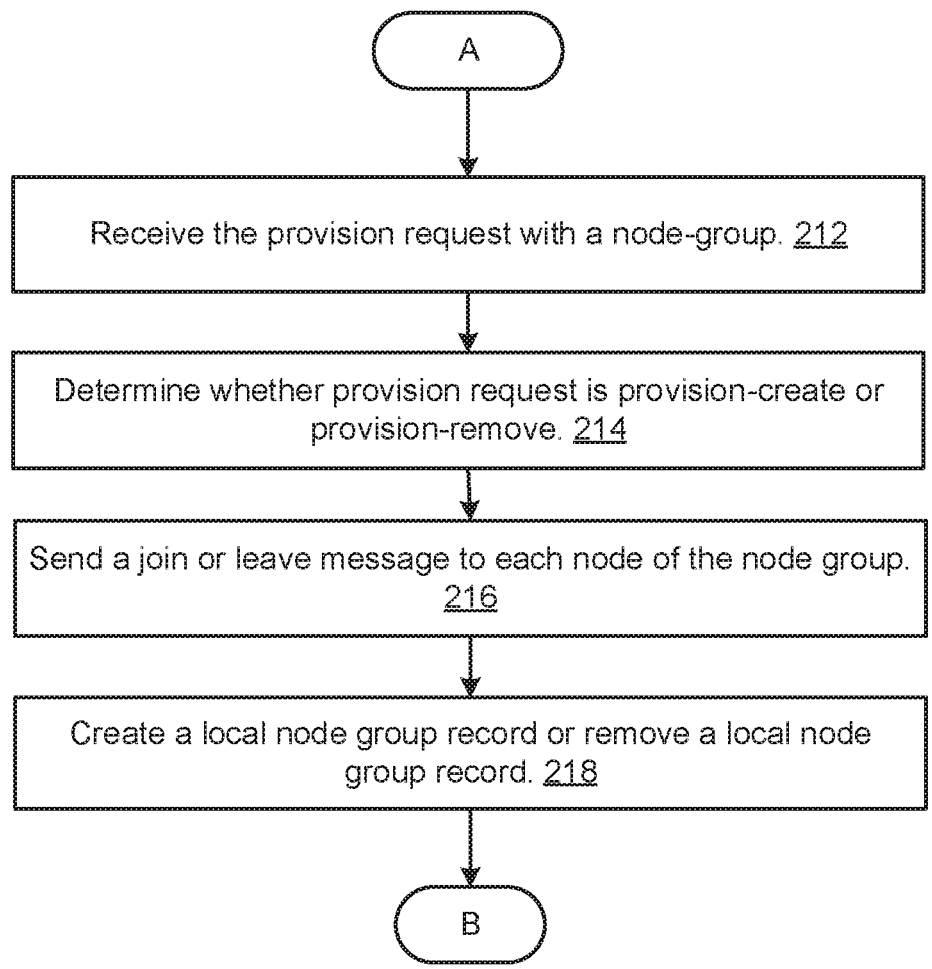

Referring to FIG. 2B, the virtual overlay network consistent provision program 110B receives a provision request with a node-group at 212. According to one embodiment, the virtual overlay network consistent provision program 110B contained in the computer server (node) 112 may receive the provision request issued by the virtual overlay network consistent provision program 110A contained in the controller 102.

At 214 the virtual overlay network consistent provision program 110B determines whether the action in the provision request is for provision-create or provision-remove. The virtual overlay network consistent provision program 110B may receive a provision request from the virtual overlay network consistent provision program 110A and determine that the action in the provision request is for provision-create when a node has been added to the node group stored in the database. If a node has been deleted from the node group stored in the database, then the virtual overlay network consistent provision program 110B may determine that the action in the provision request is for provision-remove.

At 216, the virtual overlay network consistent provision program 110B sends a join or leave a message to each node of the node group. In at least one embodiment, the virtual overlay network consistent provision program 110B may send a group-join message to each node of the node group from the provision-create request. In one other embodiment, the virtual overlay network consistent provision program 110B may send a group-leave message to each node of the node group from the provision-remove request.

At 218, the virtual overlay network consistent provision program 110B creates a local node group record or removes a local node group record. According to one embodiment, the virtual overlay network consistent provision program 110B may create a new local node group record with the node group from the provision-create request in the previous steps. For example, a new local node group may have all the previously stored nodes and a newly added node-N. According to one other embodiment, the virtual overlay network consistent provision program 110B may remove an existing local node group record with the group identifier in the provision-remove request in the previous steps.

Figure 2C:
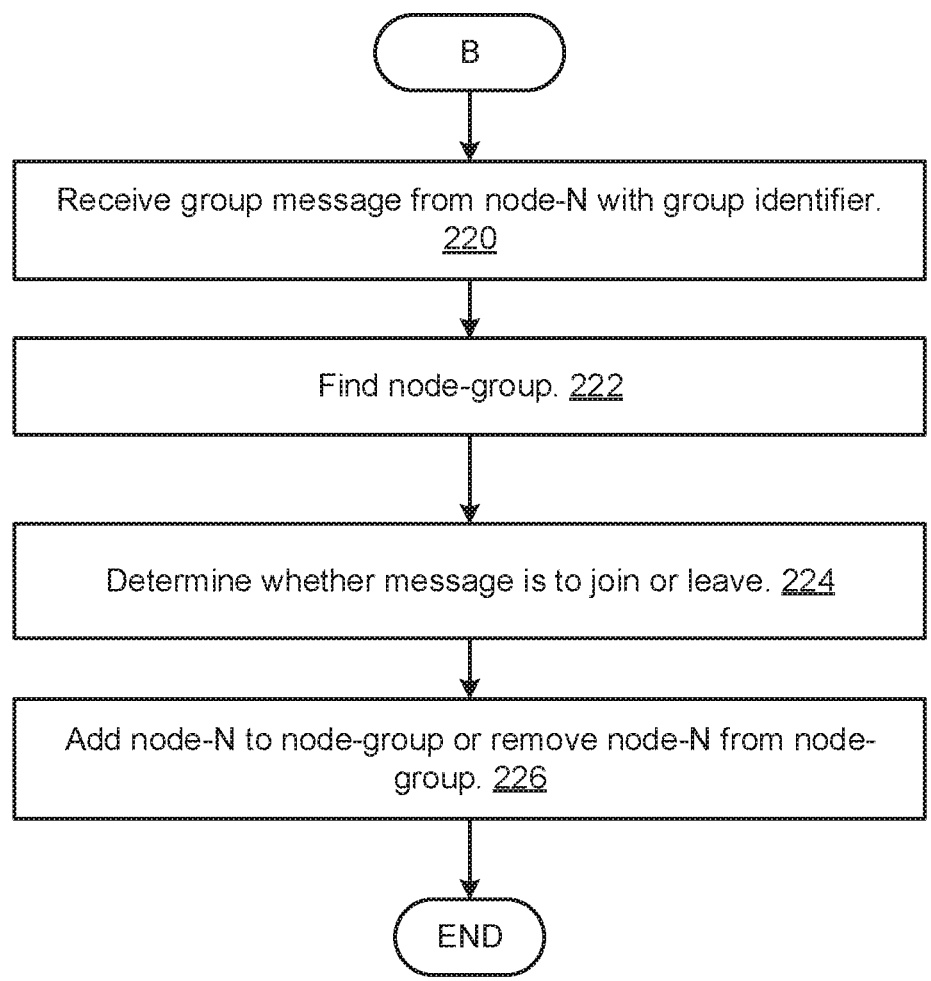

Now referring to FIG. 2C, the other member nodes of the node group receive a group message from a target node with a group identifier at 220. According to one embodiment, the virtual overlay network consistent provision program 110B may receive a group-join message from a target node for adding the target node to the node group. According to one other embodiment, the virtual overlay network consistent provision program 110B may receive a group-leave message from a target node for removing the target node from the node group.

At 222, the virtual overlay network consistent provision program 110B finds the local node group record by using the group identifier from the group message. In order for the virtual overlay network consistent provision program 110B to update each local member node record, it may first need to find a correct local node group record with the group identifier from the group message.

At 224, the virtual overlay network consistent provision program 110B determines whether the received group message is for a target node to join or leave the node group.

According to one embodiment, the virtual overlay network consistent provision program 110B may determine whether the target node is to join or leave based on the group message received from the target node in the previous steps.

At 226, the virtual overlay network consistent provision program 110B adds the target node-N to the local node group record or remove the noted-N from the local node group record based on the determination in the previous steps. According to one embodiment, the virtual overlay network consistent provision program 110B may add a target node to the local node group record so that the target node may now be contained as a member node in the local node group record. According to one other embodiment, the virtual overlay network consistent provision program 110B may remove a target node from the local node group record so that the target node may no longer be contained as a member node in the local node group record.

Figure 3A:
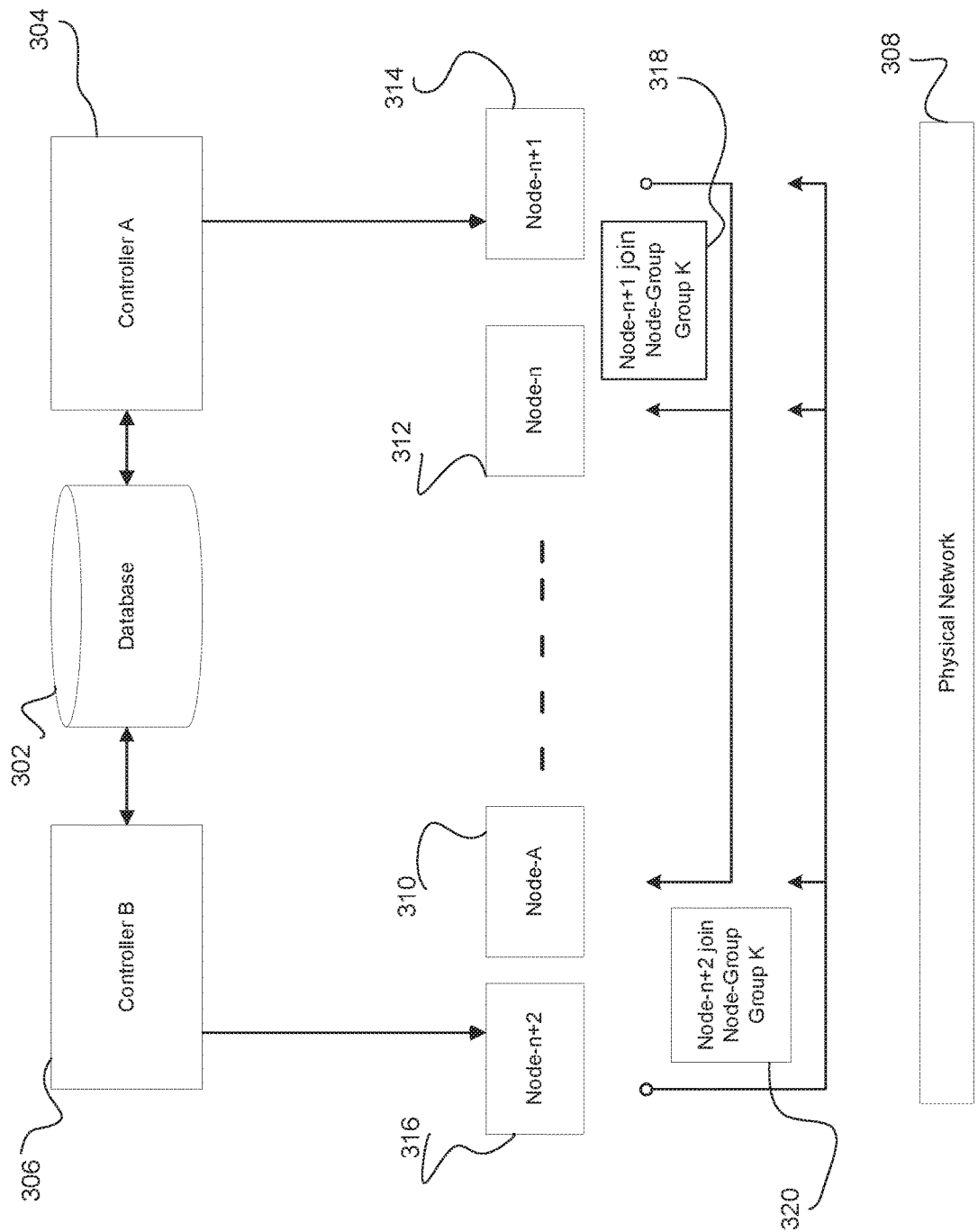
FIGS. 3A-3D are block diagrams of exemplary illustrations of a virtual overlay network consistent provision process according to at least one embodiment.

Referring to FIG. 3A, a block diagram of an exemplary illustration of a virtual overlay network consistent provision process is depicted according to at least one embodiment. In this example, Controller A 304 and Controller B 306 both are provisioning "add a node to a node group" of the same node group, Group-K, via a physical network 308, and Controller A 304's "provision-create" may get through first followed by Controller B 306's "provision-create". Controller A 304 may update the database 302 by adding a node Node-n+1 314 to the node group Group-K in the database 302, which previously had nodes starting from Node-A 310 through Node-n 312 may now contain Node-A, Node-B, Node-C . . . Node-n, and Node-n+1. Controller A 304 may then retrieve the database 302 for member nodes of the node group Group-K, and may include the above-retrieved member nodes in the provision-create request to target Node-n+1 314 to provision creating the node group Group-K to the target node, Node-n+1 314. In one embodiment, the node Node-n+1 314 may use the member nodes (Node-A, Node-B . . . Node-n, Node-n+1) from the provision-create request to construct its multicast group and may announce "joining the node group Group-K" message 318 through this multicast group to all the other nodes of the Group-K, before creating local node group Group-K record, including all member nodes from the provision-create request. This process may result in the target node Node-n+1 creating a local node-group Group-K record containing all nodes from the provision-create request, Node-A to Node-n+1, and all other nodes in the node group Group-K, Node-A to Node-n, adding the node Node-n+1 314 to their local node group Group-K record. Next, Controller B 306 updates the same database 302 by adding a node Node-n+2 316 to the same node group Group-K and then retrieves the current or the last up-to-date member node group. As one more node has been added to the member node group, the member node group Group-K may now contain Node-A, Node-B . . . Node-n, Node-n+1 and Node-n+2. Controller B 306 may include the member nodes retrieved from the database 302 in the provision-create request to the target node, Node-n+2 316 to provision creating the node group Group-K to the target node, Node-n+2 316. The target node Node-n+2 316 may now use the member nodes (Node-A, Node-B . . . Node-n, Node-n+1, Node-n+2) from the provision request to construct its multicast group and announce "joining the node group Group-K" message 320 through this multicast group to all the other nodes of the node group Group-K before creating a local node-group Group-K record including all nodes from the provision-create request. This process may result in the target node Node-n+2 creating a local node group Group-K record containing all nodes from the provision-create request, and all other nodes in the node group Group-K, including node Node-n+1 314, may learn the complete node group Group-K to include both added nodes Node-n+1 314 and Node-n+2 316 in their local node group Group-K record.

Figure 3B:
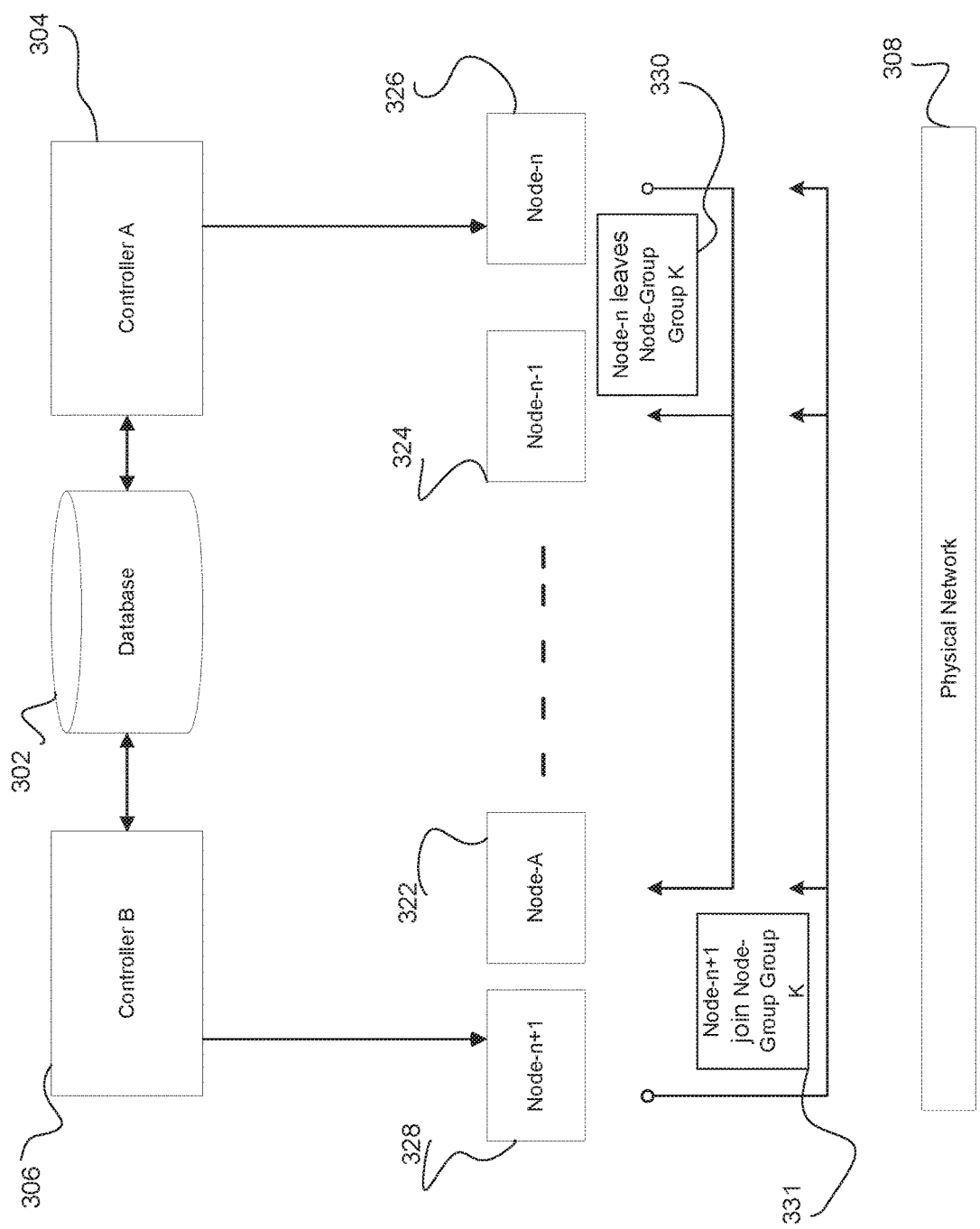

Referring to FIG. 3B a block diagram of another exemplary illustration of a virtual overlay network consistent provision process is depicted according to at least one embodiment. In this example, Controller A 304 is provisioning a "remove a node from member node group" denoted as Group-K and Controller B 306 is provisioning an "add a node to member node group" of the same node group Group-K via a physical network 308, and Controller A 304's "provision-remove" may get through first followed by Controller B 306's "provision-create". Controller A 304 may update the database 302 by removing a node Node-n 326 from the member node group Group-K in the database 302, which previously had nodes starting from Node-A 322 through Node-n 326 may now contain Node-A, Node-B . . . and Node-n−1 324. Controller A 304 then retrieves the updated member node group Group-K from the database 302 and may include the above retrieved (updated) member nodes in the provision-remove request to the target Node-n 326 for it to leave the member group Group-K. In one embodiment, the node Node-n 326 may use the member nodes (Node-A, Node-B . . . Node-n−1) from the provision request to construct its multicast group and may announce "leaving the member node group Group-K" message 330 through this multicast group to all other member nodes of the node group Group-K before removing the local member node Group-K record on target node Node-n 326, and all other nodes in the node group Group-K, Node-A 322 to Node-n−1 324, removing the node Node-n 326 from their local node group Group-K record. Next, Controller B 306 updates the same database 302 by adding a node Node-n+1 328 to the member node group Group-K and then retrieves the current or the last up-to-date member node group. As one more node has been added to the member node group, the member node group may now contain Node-A, Node-B . . . Node-n−1, and Node-n+1 328. Controller B 306 then may include the retrieved (updated) nodes of the node group Group-K in the provision-create request to the target node, Node-n+1 328 for it to join the member node group Group-K. The node Node-n+1 328 may now use the member nodes (Node-A, Node-B . . . Node-n−1, Node-n+1) from the provision-create request to construct its multicast group and announce "joining the node group Group-K" message 331 through this multicast group to all other nodes of the node group Group-K before creating local member node Group-K record with nodes (Node-A, Node-B . . . Node-n−1 324) from the provision-create request on target node Node-n+1 328. This process may result in all the current member node Group-K (Node-n−1, Node-B . . . Node-n−1, and Node-n+1 328) may contain the latest complete member nodes of Group-K and may learn the complete node group Group-K to exclude the removed node Node-n 326 and include the added Node-n+1 328 in their local node group Group-K record.

Figure 3C:
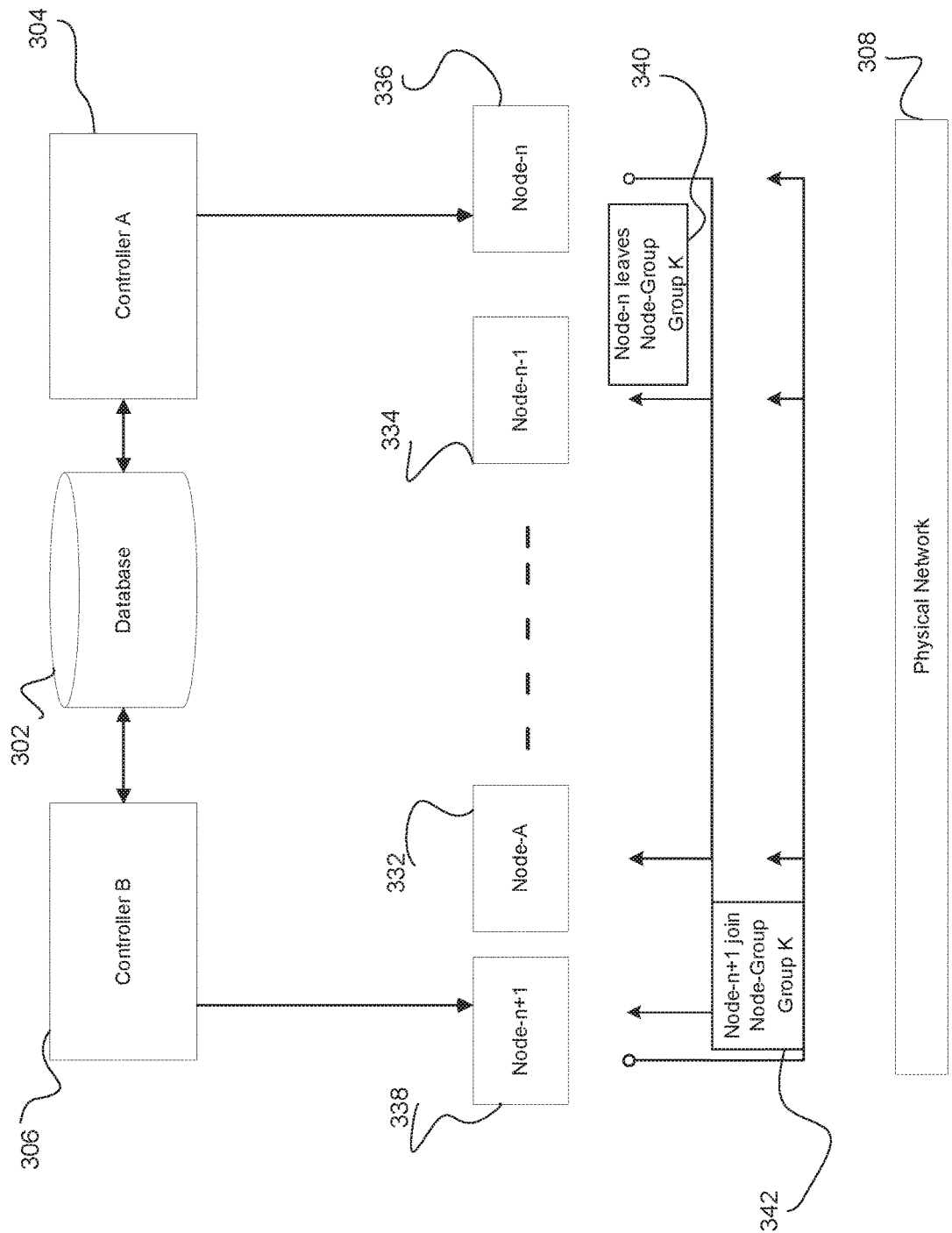

Referring to FIG. 3C, a block diagram of another exemplary illustration of a virtual overlay network consistent provision process is depicted according to at least one embodiment. In this example, Controller A 304 is provisioning a "remove a node from a member node group" denoted as Group-K and Controller B 306 is provisioning an "add a node to member node group" of the same node group Group-K via a physical network 308 and Controller B 306's "provision-create" may get through first followed by Controller A 304's "provision-remove". Controller B 306 may update the database 302 by adding a node Node-n+1 338 to the node group Group-K in the database 302, which previously had nodes starting from Node-A 332 through Node-n 336 may now contain Node-A, Node-B, Node-C . . . and Node-n+1 338. Controller B 306 then retrieve the node group Group-K from database 302 and may include the retrieved member nodes in the provision-create request to target Node-n+1 338 to for it to join the node group Group-K. In one embodiment, the node Node-n+1 338 may use the member nodes (Node-A, Node-B . . . Node-n, Node-n+1) from the provision-create request to construct its multicast group and may announce "joining the node group Group-K" message 342 to all member nodes of this multicast group before creating a local node group Group-K with member nodes from the provision-create request, and all other nodes in the node group Group-K, Node-A to Node-n, adding the node Node-n+1 338 to their local node group Group-K record. Next, Controller A 304 updates the database 302 by removing a node Node-n 336 from the same node group Group-K and then retrieve the current or the last up-to-date member nodes of the node group Group-K. As one more node has been removed from the node group Group-K, the node group Group-K may now contain Node-A, Node-B . . . Node-n−1 334, and Node-n+1 338. Controller A 304 may include the retrieved nodes with the node group Group-K in the provision-remove request to the target node, Node-n 336 for it to remove the node group Group-K. The target node Node-n 336 may now use the member nodes (Node-A, Node-B . . . Node-n−1, Node-n+1) from the provision request to construct its multicast group and announce "leaving the node group Group-K" message 340 through this multicast group before removing Group-K from its local node group record. This process may result in all the current Group-K nodes that may learn the complete node group Group-K by removing the last removed node Node-n 336 and may learn the complete node group Group-K to include the added node Node-n+1 338 and exclude the removed node Node-n+1 336 in their local node group Group-K record.

Figure 3D:
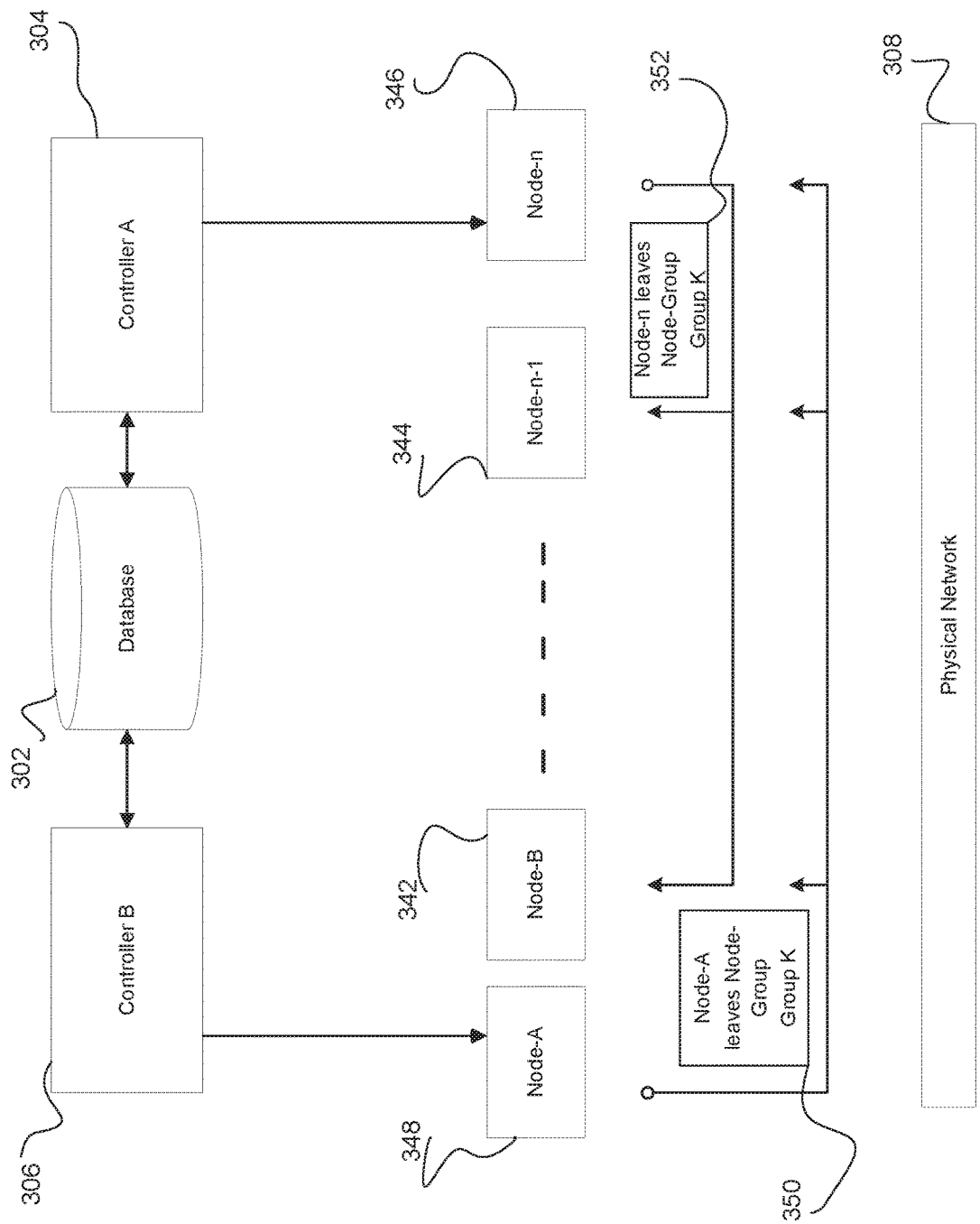

Referring to FIG. 3D, a block diagram of another exemplary illustration of a virtual overlay network consistent provision process is depicted according to at least one embodiment. In this example, both Controller A 304 and Controller B 306 are provisioning a "remove a node from a node group" of the same node group denoted as Group-K via a physical network 308 and Controller A 304's "provision-remove" may get through first followed by Controller B 306's "provision-remove". Controller A 304 may update the database 302 by removing a node Node-n 346 from node group Group-K in the database 302, which previously had nodes starting from Node A 348 through Node-n 346 may now contain Node-A, Node-B, Node-C . . . and Node-n−1 344. Controller A 304 may then retrieve the node group Group-K from database 302 and include the retrieved member nodes in the provision-remove request to target node Node-n 346 for it to leave the node group Group-K. In one embodiment, the node Node-n 346 may use the member nodes (Node-A, Node-B . . . Node-n−1) from the provision request to construct its multicast group and may announce "leaving the node group Group-K" message 352 through this multicast group to all member nodes before removing local node group Group-K record, and all other nodes in the node group Group-K, Node-A 348 to Node-n−1 344, removing the node Node-n 346 from their local node group Group-K record. Next, Controller B 306 updates the same database 302 by removing the node Node-A 348 from the node group Group-K and then retrieve the current or the last up-to-date member node group. As one more node has been removed from the member node group, the member node group may now contain Node-B, Node-C . . . and Node-n−1 344. Controller B 306 may include the retrieved nodes of the node group Group-K from database 302 in the provision-remove request to the target node, Node-A 348 for it to leave the node group Group-K. The node Node-A 348 may now use the member nodes of the node group Group-K (Node-2 . . . Node-n−1) from the provision request to construct its multicast group and announce "leaving the node group Group-K" message 350 through this multicast group before removing its local node group Group-K record. This process may result in all current nodes (Node-B, Node-C . . . and Node-n−1 344) learn the complete member node group to exclude both the removed nodes Node-n 346 and Node-A 348.

It may be appreciated that FIGS. 2A-2C and FIGS. 3A-3D provides only an illustration of one implementation and do not imply any limitations with regard to how different embodiments may be implemented. Many modifications to the depicted environments may be made based on design and implementation requirements. For example, in at least one embodiment, the virtual overlay network consistent provision program 110A, 110B may use per virtual network node group membership to build a multicast group among the member node IP addresses by means of N-way unicast. Also, a node group identifier may be any kind of globally unique identifier that can uniquely identify a layer-2 virtual network. One such example is a universally unique identifier (UUID) generated to identify a unique layer-2 virtual network. In the case of VXLAN, the 24-bit segment ID known as the VXLAN network identifier (VNID) is globally unique across VXLAN virtual overlay networking and may be used as the node group identifier for VXLAN based virtual overlay networking.

Figure 4:
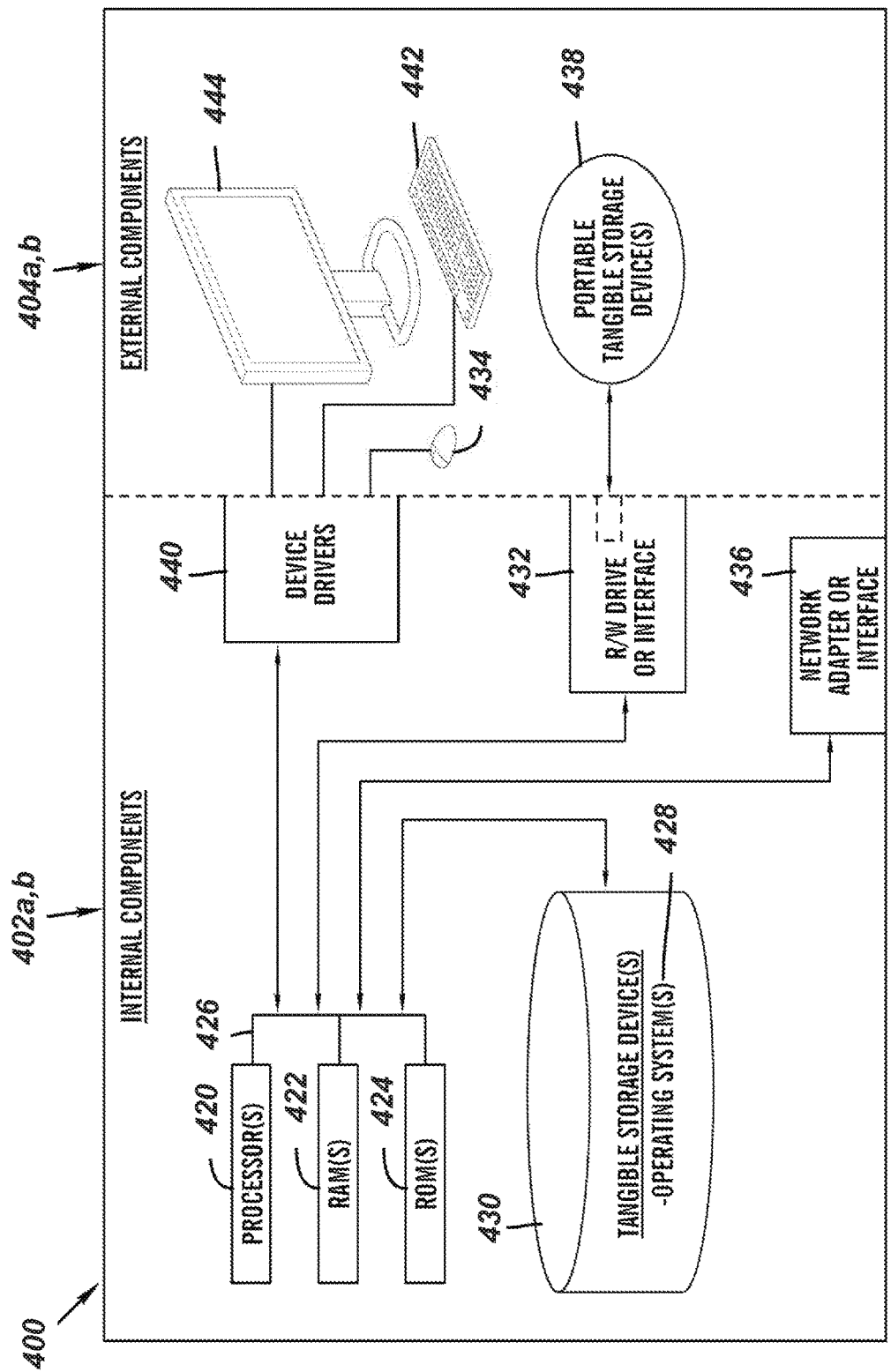
FIG. 4 is a block diagram of internal and external components of computers and servers depicted in FIG. 1 according to at least one embodiment.

FIG. 4 is a block diagram of internal and external components of the controller 102 and server 112 depicted in FIG. 1 in accordance with an embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

The data processing system 402, 404 is representative of any electronic device capable of executing machine-readable program instructions. The data processing system 402, 404 may be representative of a smartphone, a computer system, PDA, or other electronic devices. Examples of computing systems, environments, and/or configurations that may represented by the data processing system 402, 404 include, but are not limited to, personal computer systems, server computer systems, thin clients, thick clients, handheld or laptop devices, multiprocessor systems, microprocessor-based systems, network PCs, minicomputer systems, and distributed cloud computing environments that include any of the above systems or devices.

The controller 102 and the server 112 may include respective sets of internal components 402 *a,b* and external components 404 *a,b* illustrated in FIG. 4. Each of the sets of internal components 402 include one or more processors 420, one or more computer-readable RAMs 422, and one or more computer-readable ROMs 424 on one or more buses 426, and one or more operating systems 428 and one or more computer-readable tangible storage devices 430. The one or more operating systems 428, the software program 108 and the virtual overlay network consistent provision program 110A in the controller 102 and the virtual overlay network consistent provision program 110B in the server 112 are stored on one or more of the respective computer-readable tangible storage devices 430 for execution by one or more of the respective processors 420 via one or more of the respective RAMs 422 (which typically include cache memory). In the embodiment illustrated in FIG. 4, each of the computer-readable tangible storage devices 430 is a magnetic disk storage device of an internal hard drive. Alternatively, each of the computer-readable tangible storage devices 430 is a semiconductor storage device such as ROM 424, EPROM, flash memory or any other computer-readable tangible storage device that can store a computer program and digital information.

Each set of internal components 402 a,b also includes an R/W drive or interface 432 to read from and write to one or more portable computer-readable tangible storage devices 438 such as a CD-ROM, DVD, memory stick, magnetic tape, magnetic disk, optical disk or semiconductor storage device. A software program, such as the virtual overlay network consistent provision program 110A, 110B may be stored on one or more of the respective portable computer-readable tangible storage devices 438, read via the respective R/W drive or interface 432 and loaded into the respective hard drive 430.

Each set of internal components 402 a,b also includes network adapters or interfaces 436 such as a TCP/IP adapter cards, wireless Wi-Fi interface cards, or 3G or 4G wireless interface cards or other wired or wireless communication links. The software program 108 and the virtual overlay network consistent provision program 110A in the controller 102 and the virtual overlay network consistent provision program 110B in the server 112 can be downloaded to the controller 102 and the server 112 from an external computer via a network (for example, the Internet, a local area network or other, wide area network) and respective network adapters or interfaces 436. From the network adapters or interfaces 436, the software program 108 and the virtual overlay network consistent provision program 110A in the controller 102 and the virtual overlay network consistent provision program 110B in the server 112 are loaded into the respective hard drive 430. The network may comprise copper wires, optical fibers, wireless transmission, routers, firewalls, switches, gateway computers and/or edge servers.

Each of the sets of external components 404 a,b can include a computer display monitor 444, a keyboard 442, and a computer mouse 434. External components 404 a,b can also include touch screens, virtual keyboards, touch pads, pointing devices, and other human interface devices. Each of the sets of internal components 402 a,b also includes device drivers 440 to interface to computer display monitor 444, keyboard 442, and computer mouse 434. The device drivers 440, R/W drive or interface 432, and network adapter or interface 436 comprise hardware and software (stored in storage device 430 and/or ROM 424).

It is understood in advance that although this disclosure includes a detailed description on cloud computing, implementation of the teachings recited herein is not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is a service oriented with a focus on statelessness, low coupling, modularity, and semantic interoperability. At the heart of cloud computing is an infrastructure comprising a network of interconnected nodes.

Figure 5:
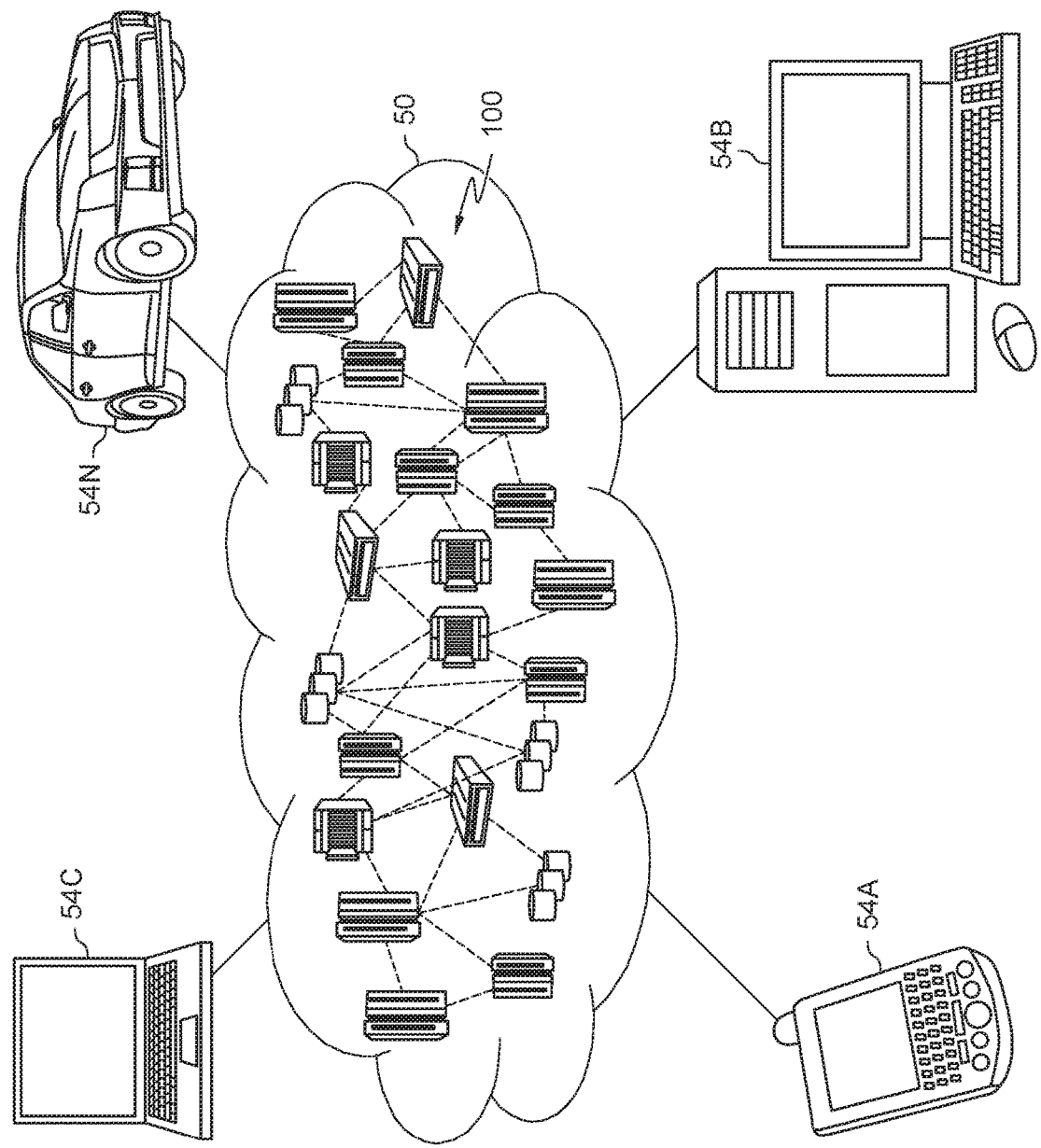
FIG. 5 depicts a cloud computing environment according to an embodiment of the present invention.

Referring now to FIG. 5, illustrative cloud computing environment 50 is depicted. As shown, cloud computing environment 50 comprises one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 100 and cloud computing environment 50 can communicate with any type of computerized device over any type of network and/or network addressable connection (e.g., using a web browser).

Figure 6:
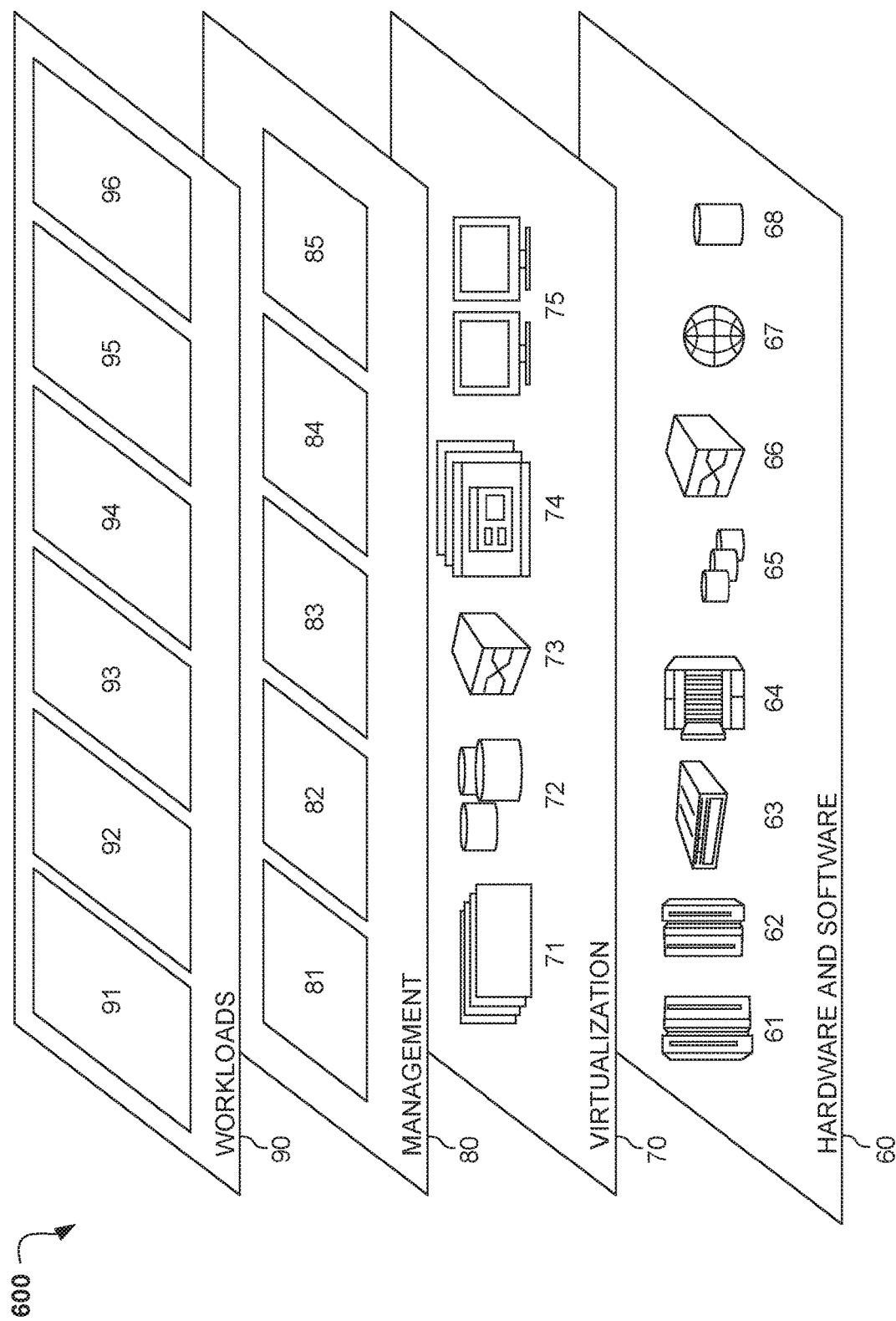
FIG. 6 depicts abstraction model layers according to an embodiment of the present invention.

Referring now to FIG. 6, a set of functional abstraction layers 600 provided by cloud computing environment 50 is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and consistent member node group provision 96. Consistent member node group provision 96 may relate to performing member node synchronization to all member nodes of the same member node group in reaction to a provision call.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method for provisioning member node group information on a virtual overlay network in a multi-controller cloud environment, the method comprising:

receiving, by a controller, a node-to-member node group association call from a user, wherein the member node group association call is either an add-association call or a remove-association call, updating a database based on the received add-association call or the remove-association call, wherein the controller first updates a database by adding or removing a target node to or from, respectively, a member node group by a node group identifier in the database;

retrieving the database of a latest-updated node group by the node group identifier from the database;

creating a provision-action request to send to the target node, wherein the provision-action request is either a provision-create request or a provision-remove request, the updated member node group from the database is retrieved before making the provision-action request to the target node and the provision-action request contains information about the retrieved member node group;

receiving the provision-action request on a target compute server node;
sending a group message to all nodes from the provision-action request, wherein the group message is either a target node group-join or target node group-leave;
updating local node group record with node group information from the provision-action request, wherein the updating is either a creation of a local node group record or removal of a local node group record;
receiving the group message on all compute server nodes of the member node group; and
performing member node synchronization on all member nodes of the member node group in response to the provision-action request.

2. The method of claim 1, further comprising:
constructing a target node multicast group; and
announcing a node group message with action of either join or leave to all member nodes through the constructed multicast group.

3. The method of claim 1, further comprising:
processing an association call by a first controller to add a node to a member node group before processing an association call by a second controller to add a node to the same member node group, wherein the node addition by the first controller handling of an association call is added before the node addition by the second controller handling of association call, wherein the updated node group information of the node addition by the first controller and node addition by the second controller are all consistently included in all of the previously existing member nodes and newly added nodes.

4. The method of claim 1, further comprising:
processing an association call by a first controller to remove a node from a member node group before processing an association call by a second controller to add a node to the same member node group, wherein the node removal by the first controller handling of an association call is removed from the node group before the node addition by the second controller handling of association call, wherein updated node group information of the node removal by the first controller and the node addition by the second controller are all consistently updated in all of the currently existing member nodes and newly added node from the second controller association call.

5. The method of claim 1, further comprising:
processing an association call by a first controller to add a node to a member node group before processing an association call by a second controller to remove a node from the same member node group, wherein the node addition by the first controller handling of an association call is added before the node removal by the second controller handling of association call is removed, wherein updated node group information of the node addition by the first controller and the node removal by the second controller are all consistently updated in all currently existing member nodes and the newly added node from the first controller association call.

6. The method of claim 1, further comprising:
processing an association call by a first controller to remove a node from a member node group before processing an association call by a second controller to remove another node from the same member node group, wherein the node removal by the first controller handling of an association call is removed before the node removal by the second controller handling of association call is removed, wherein updated node group information of the node removal by the first controller and the node removal by the second controller are all consistently updated in all currently existing member nodes.

7. A computer system for provisioning member node group information on a virtual overlay network in a multi-controller cloud environment, the computer system comprising:
one or more processors, one or more computer-readable memories, one or more computer-readable tangible storage media, and program instructions stored on at least one of the one or more tangible storage media for execution by at least one of the one or more processors via at least one of the one or more memories, wherein the computer system is capable of performing a method comprising:
receiving, by a controller, a node-to-member node group association call from a user, wherein the member node group association call is either an add-association call or a remove-association call,
updating a database based on the received add-association call or the remove-association call, wherein the controller first updates a database by adding or removing a target node to or from, respectively, a member node group by a node group identifier in the database;
retrieving the database of a latest-updated node group by the node group identifier from the database;
creating a provision-action request to send to the target node, wherein the provision-action request is either a provision-create request or a provision-remove request, the updated member node group from the database is retrieved before making the provision-action request to the target node and the provision-action request contains information about the retrieved member node group;
receiving the provision-action request on a target compute server node;
sending a group message to all nodes from the provision-action request, wherein the group message is either a target node group-join or target node group-leave;
updating local node group record with node group information from the provision-action request, wherein the updating is either a creation of a local node group record or removal of a local node group record;
receiving the group message on all compute server nodes of the member node group; and
performing member node synchronization on all member nodes of the member node group in response to the provision-action request.

8. The computer system of claim 7, further comprising:
constructing a target node multicast group; and
announcing a node provision action of either join or leave to all member nodes through the constructed multicast group.

9. The computer system of claim 7, further comprising:
processing an association call by a first controller to add a node to a member node group before processing an association call by a second controller to add a node to the same member node group, wherein the node addition by the first controller handling of an association call is added before the node addition by the second controller handling of association call, wherein the updated node group information of the node addition by the first controller and node addition by the second controller are all consistently included in all of the previously existing member nodes and newly added nodes.

10. The computer system of claim 7, further comprising:
processing an association call by a first controller to remove a node from a member node group before processing an association call by a second controller to add a node to the same member node group, wherein the node removal by the first controller handling of an association call is removed from the node group before the node addition by the second controller handling of association call, wherein updated node group information of the node removal by the first controller and the node addition by the second controller are all consistently updated in all of the currently existing member nodes and newly added node from the second controller association call.

11. The computer system of claim 7, further comprising:
processing an association call by a first controller to add a node to a member node group before processing an association call by a second controller to remove a node from the same member node group, wherein the node addition by the first controller handling of an association call is added before the node removal by the second controller handling of association call is removed, wherein updated node group information of the node addition by the first controller and the node removal by the second controller are all consistently updated in all currently existing member nodes and the newly added node from the first controller association call.

12. The computer system of claim 7, further comprising:
processing an association call by a first controller to remove a node from a member node group before processing an association call by a second controller to remove another node from the same member node group, wherein the node removal by the first controller handling of an association call is removed before the node removal by the second controller handling of association call is removed, wherein updated node group information of the node removal by the first controller and the node removal by the second controller are all consistently updated in all currently existing member nodes.

13. A computer program product for provisioning member node group information on a virtual overlay network in a multi-controller cloud environment, the computer program product comprising:
one or more computer-readable tangible storage media and program instructions stored on at least one of the one or more tangible storage media, the program instructions executable by a processor of a computer to perform a method, the method comprising
receiving, by a controller, a node-to-member node group association call from a user, wherein the member node group association call is either an add-association call or a remove-association call,
updating a database based on the received add-association call or the remove-association call, wherein the controller first updates a database by adding or removing a target node to or from, respectively, a member node group by a node group identifier in the database;
retrieving the database of a latest-updated node group by the node group identifier from the database;
creating a provision-action request to send to the target node, wherein the provision-action request is either a provision-create request or a provision-remove request, the updated member node group from the database is retrieved before making the provision-action request to the target node and the provision-action request contains information about the retrieved member node group;
receiving the provision-action request on a target compute server node;
sending a group message to all nodes from the provision-action request, wherein the group message is either a target node group-join or target node group-leave;
updating local node group record with node group information from the provision-action request, wherein the updating is either a creation of a local node group record or removal of a local node group record;
receiving the group message on all compute server nodes of the member node group; and
performing member node synchronization on all member nodes of the member node group in response to the provision-action request.

14. The computer program product of claim 13, further comprising:
constructing a target node multicast group; and
announcing a node provision action of either join or leave to all member nodes through the constructed multicast group.

15. The computer program product of claim 13, further comprising:
processing an association call by a first controller to add a node to a member node group before processing an association call by a second controller to add a node to the same member node group, wherein the node addition by the first controller handling of an association call is added before the node addition by the second controller handling of association call, wherein the updated node group information of the node addition by the first controller and node addition by the second controller are all consistently included in all of the previously existing member nodes and newly added nodes.

16. The computer program product of claim 13, further comprising:
processing an association call by a first controller to remove a node from a member node group before processing an association call by a second controller to add a node to the same member node group, wherein the node removal by the first controller handling of an association call is removed from the node group before the node addition by the second controller handling of association call, wherein updated node group information of the node removal by the first controller and the node addition by the second controller are all consistently updated in all of the currently existing member nodes and newly added node from the second controller association call.

17. The computer program product of claim 13, further comprising:
processing an association call by a first controller to add a node to a member node group before processing an association call by a second controller to remove a node from the same member node group, wherein the node addition by the first controller handling of an association call is added before the node removal by the second controller handling of association call is removed, wherein updated node group information of the node addition by the first controller and the node removal by the second controller are all consistently updated in all currently existing member nodes and the newly added node from the first controller association call.

\* \* \* \* \*